Figure 1:
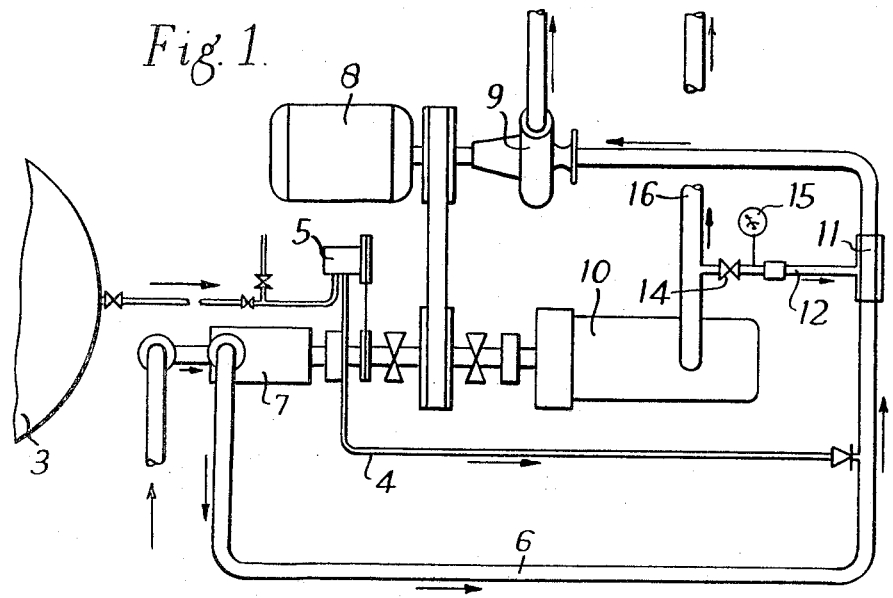

June 20, 1967     J. CZEKANSKI ETAL     3,326,174

METHOD FOR PREVENTION OF GROWTH OF AQUATIC FOULING

Filed Sept. 2, 1965

INVENTORS
Joseph Czekanski and
James Smith
BY Wenderoth,
Lind & Ponack ATTORNEYS

United States Patent Office 3,326,174
Patented June 20, 1967

3,326,174
METHOD FOR PREVENTION OF GROWTH OF AQUATIC FOULING
Joseph Czekanski, Whickham, and James Smith, South Shields, England, assignors to Charlton, Weddle & Company Limited, Newcastle, England, a British company
Filed Sept. 2, 1965, Ser. No. 484,694
6 Claims. (Cl. 114—222)

The present invention relates to the prevention or delay of the growth of marine fouling on the underwater surfaces of ship hulls and other structures immersed in sea water.

It has long been recognized that the growth of marine fouling, both animal and vegetable may be prevented or delayed by the release of toxic substances at such surfaces and for this purpose it is the conventional practice to coat the surface with an anti-fouling composition, from which a toxic substance is slowly leached out. However such coatings require to be renewed periodically and for such purpose it is necessary to scrape down the hull of the ship and apply a fresh coating in a dry dock, which is an expensive and time-consuming procedure.

It has already been proposed to inhibit the growth of marine fouling by releasing a stream of gas bubbles from conduits positioned longitudinally of the hull and close to the keel. The object of this operation is to disturb the water in the immediate vicinity of the hull and so prevent the lodgement of the spores of marine growths.

It has also been proposed to inhibit the growth of marine fouling on a ship hull by projecting a liquid marine growth deterrent against the hull, such deterrent consisting of kerosene, usually containing a dissolved toxin and a wetting agent intended to improve the spread of the kerosene over the ship hull. For economy the kerosene was ejected in the form of droplets carried in a stream of gas, usually air, bubbles. The aim of this process is to form a film of kerosene on the underwater surface of the hull.

Whilst this system has enjoyed a degree of success with ships having fine lines, it has not been at all successful with tankers, which are very square in section. This lack of success is believed to be due to the fact that the ascending air bubbles do not bring the toxin-laden kerosene into adequate contact with the ship hull to establish a kerosene film to deter the growth of marine fouling, particularly marine grasses and algae.

The present invention approaches the same problem from a different standpoint. In the method of the present invention it is the intention to bring the underwater hull of the ship into contact with water-dissolved or water-dispersed toxin, and for this purpose it is proposed to emit, from nozzles positioned close to the bilge keel, a dispersion of toxin in water, which is caused to move slowly over the surface of the underwater hull of the ship. Preferably fine air bubbles are mixed with the water-dispersed toxin to render it buoyant and thus move it slowly over the underwater hull as the air bubbles move up to the surface of the sea. In order that the air may be broken down into and maintained in the form of small bubbles, the water-dispersed toxin also includes a proportion of surface active agent in an amount sufficient to produce a foam, preferably an unstable foam. This expedient helps to maintain the integrity of the barrier layer of water-dispersed toxin which moves slowly upwards over the underwater surface of the ship. It is, of course, possible for the toxin and the surface active agent to be one and the same substance.

According to the present invention a method for preventing or delaying the growth of marine fouling on the surfaces of ships' hulls comprises emitting jets of water-dispersed toxin at spaced positions along the ship's hull. Preferably the emitted jets of water-dispersed toxin contain fine air or gas bubbles dispersed therein. The dispersion of gas in water is preferably at least partially stabilised by the addition of a surface active agent. Where the lines of the ship are very square it is preferred to liberate a separate stream of air bubbles from nozzles positioned close to the bilge keel and at a level below the toxin-omission nozzles in this region, so as to accelerate the upward movement of the gas-in-water, containing dispersed toxin.

In the process of the present invention it is preferred to use as the toxin one of the highly toxic trialkyl tin or triaryl tin compounds, which are known to be very toxin to all forms of marine fouling growth when present in water at great dilution.

As a preferred toxin we employ tributyl tin oxide. This substance can readily be dispersed in sea water using a surface active agent, so that the surface active agent may be utilized for the double purpose of assisting in the dispersion of the toxin in sea water and then reducing the surface tension of the sea water to permit the dispersion of air therein in the form of fine, relatively stable bubbles. Furthermore tributyl tin oxide can form a stable solution in at least some known non-ionic surface active agents.

Figure 2:
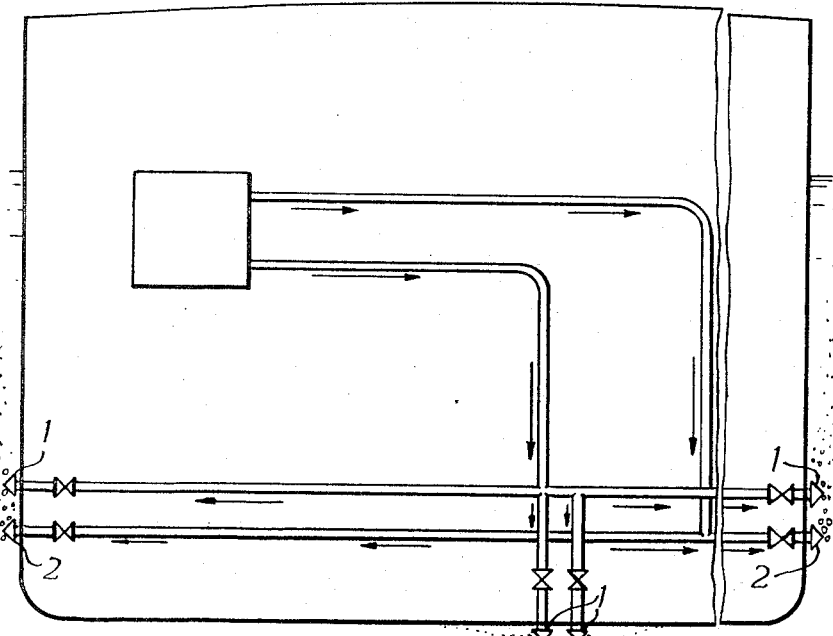

Referring now to the accompanying drawings:
FIGURE 1 is a schematic arrangement of the mixing and pumping station incorporated in a system in accordance with the present invention;
FIGURE 2 is a diagram indicating the position of the emission nozzles on the ship's hull.

In a practical system for the application of the present invention the emitted material is discharged through manifolds 1 which are formed with emission nozzles at approximately 6" spacing. There is one manifold 1 on each side of the keel and a separate manifold 1 at the bilge keel on both sides of the hull and the emission nozzles in each manifold are so shaped, in accordance with known principles, that the quantity of liquid emitted from all nozzles in each manifold is substantially equal. However the emission rate from the manifold 1 at the bilge keel may be greater than from the manifold 1 at the keel. An air manifold 2 is positioned just below the manifold 1 at the bilge keel. All the manifolds 1 and 2 extend over the full length of the vessel. The manifold 2 is utilised to accelerate the upward movement of the gas-in-water dispersion emitted from the manifold 1 at the bilge keel so as to prevent it being washed away before reaching the suface of the sea, as might happen when the ship is at anchor in a tideway.

The apparatus at the mixing and pumping station shown in FIGURE 1 comprises a storage tank 3, which is employed to hold a suitable quantity of a solution of tin toxin in a surface active agent. This solution is drawn off at a steady rate through a pipe 4 by means of an injector pump 5 and is delivered to a sea water delivery pipe 6, through which sea water is pumped at a substantial and steady rate by a pump 7. If the tin toxin is not completely miscible with the wetting agent, some form of continuously acting stirrer is incorporated in the tank 3.

Both the injector pumps 4, 5 and sea water pump 7 are driven by a motor 8, which also drives a delivery pump 9 and an air compressor 10. The mixture of sea water and tin toxin, dispersed by means of the wetting agent, is mixed with air at an ejector 11, which is supplied with air through the branch pipe 12 from the air compressor 10 at a rate controlled by a valve 14 by reference to a flow meter 15.

The mixture of air and water, issuing from the ejector 11, is further mixed and converted into a fine dispersion of air-in-water by the action of the delivery pump 9, which is of the centrifugal type. The pump 9 then supplies the foamed dispersion of tin-toxin in water to the emission manifolds 1. The air compressor 10 also delivers air through a branch pipe 16 to the air manifolds 2.

Trials indicate that the rate of water emission from the manifolds should be about 2 gals./min. per manifold per 100 foot length of hull. The amount of tributyl tin toxin in the water should be about 1 gm. per 2 gallons of sea water (approximately 0.01%), whilst the surface active agent should be present to the extent of about 0.01–0.1% in the water. Using tributyl tin oxide and Lissapol NX, a non-ionic wetting agent supplied by Imperial Chemical Industries Ltd., a stable dispersion or solution of toxin in undiluted surface active agent is readily obtainable within the proportions required to give rise to the required relative concentrations of toxin and surface active agent in the sea water emitted from the manifolds 1.

The volume of air mixed with the toxin-carrying sea water is preferably from about one eighth up to a volume equal to twice the volume of the sea water and is dispersed in the form of very fine bubbles so that a layer of foamed water-dispersed toxin is formed adjacent the underwater surface of the hull. The water-dispersed toxin is carried upwardly in close contact with the hull by the dispersed air bubbles and a high proportion of the toxin is retained in the boundary layer against the surface of the hull as the air bubbles rise to the surface. The proportion of air mixed in the foam depends on the lines of the ship and may be varied, depending upon a number of factors, such as local conditions of tidal current.

The surface-active agent, in which tributyl tin oxide is dispersed, or dissolved, is preferably non-ionic and does not contain water, so that it can be stored for prolonged periods without appreciable deterioration of the tributyl tin oxide. The surface active agent selected preferably also breaks down in a relatively short time after discharge into the sea, so as to avoid the build up of high concentrations of surface active agent in enclosed waters, such as docks. Depending on the surface-active agent employed, it may be necessary to discharge some known anti-foaming agent onto the surface of the sea at or near the water line of the ship to prevent the build-up of foam on the surface of the sea, where the water-dispersed toxin reaches the surface of the sea.

In one particular example of a ship 500 feet in length, employing the system illustrated in FIGURES 1 and 2, the tank 3 contained a mixture of a non-ionic surface active agent and tributyl-tin oxide in the proportions of two parts surface active agent to one part tin toxin. This was supplied at a metered rate of 60 ccs./minute by the pump 5 to the delivery pipe 6 in which it became dispersed in sea water, flowing at the rate of 40 gals./minute.

This water-dispersion of tributyl-tin oxide was then mixed with air in the ejector 11, the air being supplied to the ejector at the rate of 6.4 cubic feet/minute (i.e. in a volume substantially equal to that of the sea water). The remainder of the output of the 80 cubic feet per minute compressor 10 was passed to the manifolds 2 or allowed, wholly or in part, to blow off to atmosphere.

In one modification of the apparatus one or more branch manifolds extend at right angles from the manifolds 1 at the keel so as to discharge toxin across the whole width of the hull and thus ensure that the whole bottom of the hull is swept by water-dispersed toxin when the ship is at anchor in a tideway. Similarly, one or more vertical manifolds may be provided at the sides of the ship for the same purpose.

In another modification the water-dispersed toxin is dispersed in gas and emitted from the manifolds as a water-in-gas dispersion.

We claim:
1. A method for preventing or delaying the growth of marine fouling on the surfaces of a ship hull comprising forming a foam of fine air or gas bubbles in water containing a dispersed toxin and emitting jets of said foam at spaced positions along the ship's hull.

2. A method according to claim 1 wherein said foam is emitted from nozzles in manifolds close to the keel and further manifolds close to the bilge keel of the hull and the longitudinal interval between the jet-emitting nozzles in each manifold is approximately six inches.

3. A method according to claim 2 wherein air bubbles are emitted from an additional manifold positioned below each manifold at the bilge keel to accelerate the upward movement of the foamed water-dispersed toxin emitted therefrom.

4. A method according to claim 1 wherein the toxin is selected from tri-alkyl tin and tri-aryl tin compounds and is emitted in the form of a dispersion in water at the rate of about 4 gms./minute per 100 foot length of the ship's hull.

5. A method according to claim 2 in which said foam is produced by dispersing a toxin, selected from tri-alkyl tin and tri-aryl tin compounds, in water to the extent of about 0.01%, the dispersion of tin toxin being then foamed by the dispersion of the fine air bubbles therein, the foam being partially stabilised by the presence of a non-ionic surface active agent in the aqueous phase.

6. A method according to claim 1 further comprising dispersing a toxin selected from the group of tri-alkyl tin and tri-aryl tin compounds in an undiluted liquid surface active agent, continuously feeding a metered quantity of such dispersion into a stream of sea water to produce an aqueous dispersion of said toxin, continuously mixing such stream of sea water with air under conditions such as to disperse the air in the aqueous dispersion in the form of fine bubbles, the thus-foamed mixture being then emitted as jets of foam.

References Cited

UNITED STATES PATENTS

| | | | |
|---|---|---|---|
| 1,430,773 | 10/1922 | Van Meter | 114—22 |
| 2,957,785 | 10/1960 | Leatherland | 106—15 |
| 3,241,512 | 3/1966 | Green | 114—222 |

FOREIGN PATENTS 851,902  10/1960  Great Britain.

MILTON BUCHLER, *Primary Examiner.*

B. BELKIN, *Assistant Examiner.*